Nov. 15, 1938.　　　　D. A. YOUNG　　　　2,137,071

SPEED REGULATING SYSTEM

Filed Sept. 23, 1937

WITNESSES:

INVENTOR
Douglass A. Young.
BY
ATTORNEY

Patented Nov. 15, 1938

2,137,071

UNITED STATES PATENT OFFICE 2,137,071

SPEED REGULATING SYSTEM

Douglass A. Young, East Orange, N. J., assignor to Westinghouse Electric & Manufacturing Company, East Pittsburgh, Pa., a corporation of Pennsylvania Application September 23, 1937, Serial No. 165,341

9 Claims. (Cl. 171—229)

My invention relates, generally, to synchronizing systems, and, more particularly, to a system for holding a motor-driven alternating-current generator in step with a standard frequency source of small output.

An object of my invention is to provide a system for so controlling the speed of a motor as to cause an alternating-current generator driven thereby to automatically keep in step with an independent source of alternating current.

Another object of the invention is to provide a control for a direct-current motor which shall function to maintain a constant motor speed under control of an alternating-current source of constant frequency.

A more specific object of the invention is to provide a speed control system for a direct-current motor which shall function to so vary the field excitation of the motor, in response to the variation of the frequency of an alternating-current generator, driven by the motor, from the frequency of a standard alternating-current source, as to cause the motor to maintain a speed determined by the frequency of said standard alternating-current source.

A further object of the invention is to provide for utilizing a contact-making device operated in accordance with a standard or base frequency to control the speed of the driving means for an alternating current generator to maintain a predetermined relation between the frequency of the generator and the base frequency.

Figure 1:
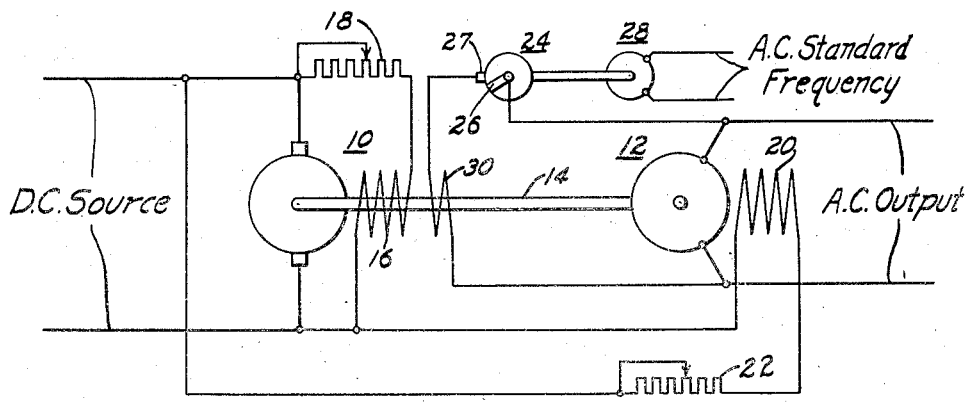
Figure 2:
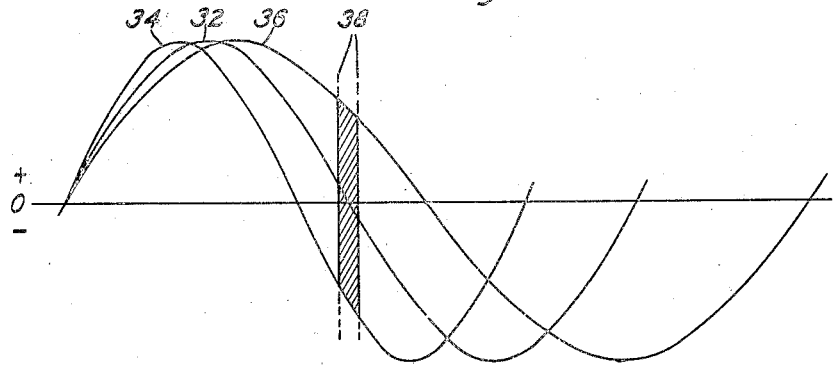

These and other objects and advantages of my invention will be apparent from the following detailed description taken in connection with the accompanying drawing, in which:

Figure 1 is a diagrammatic illustration of the cooperative relationships of the several elements comprising my invention; and Fig. 2 is a diagram showing the relation of the generated voltage of the generator of Fig. 1 and the control impulses applied to the direct-current motor field of Fig. 1.

In practicing my invention an alternating-current generator is driven by a direct-current motor and the motor is provided with main and auxiliary field windings. A synchronous motor driven from a standard frequency source drives a make-and-break device which connects the auxiliary field winding of the direct-current motor with the generated voltage for a short interval during each cycle of the standard frequency. The speed of the direct-current motor is thus increased or decreased by impulses from the generated voltage acting on its auxiliary field winding, the direction of current flow of the impulses depending upon whether the generated frequency is greater or less than the standard frequency.

Referring now to Fig. 1 of the drawing, a direct-current motor 10 drives an alternating-current generator 12 through a mechanical connection 14. The direct-current motor 10 has a main field winding 16, the energization of which may be varied by a rheostat 18 to adjust the speed of the motor. The alternating-current generator 12 is excited by a field winding 20, the energization of which may be varied by a rheostat 22 to vary the potential of the alternating-current output of the generator.

A commutator device 24 having a single conducting segment 26 and a cooperating brush 27 is continuously driven by a synchronous motor 28 which is energized from a source of alternating current of the frequency which it is desired to maintain on the alternating-current generator 12. An auxiliary field winding 30 is provided for motor 10 and is connected to the terminals of generator 12 in series circuit relation with the commutator segment 26 and brush 27.

In the operation of the device, it will be seen that the potential generated by the generator 12 will be applied to the auxiliary field winding 30 of motor 10 periodically at a frequency which is exactly equal to the frequency of alternating-current source which is provided as a standard to govern the frequency of the alternator 12.

Assume now that the motor 10 has been brought up to synchronous speed so that the frequency of generator 12 is exactly the same as that of the alternating-current standard source, and that contact is being made between segment 26 and brush 27 to energize field winding 30 at approximately the point of zero potential in the alternating-current wave of generator 12. This condition is shown in Fig. 2, where the sine wave 32 represents the output voltage of the generator 12 at exactly the frequency of the alternating-current standard. In Fig. 2 the area between the dotted lines 38 represents the time interval during which the coil 30 is connected to the output of generator 12 by the commutator device 24. It will be seen that during this interval, when the frequency of the generator 12 is equal to the alternating-current standard frequency, the impulse applied to the field winding 30 will be such as is represented by the shaded area between the dotted lines 38 and between the base line and the curve 32. Since one of these impulses represents current flowing in one direction and the other impulse represents current flowing in the opposite direction, and since the impulses are substantially equal, the net energization of the field winding 30 will be zero and the impulse applied to the field winding 30 by the commutator device 24 will have no effect upon the excitation or speed of motor 10.

If it is now assumed that the speed of motor 10 is increased for some reason or other, causing the frequency of the output of generator 12 to increase, the resultant potential curve of generator 12 may be represented by curve 34 in Fig. 2. The impulse applied to field coil 30 by the commutator device 24 in this case will be represented by the shaded area contained between the dotted lines 38 and the base line and curve 34. It will be seen that this impulse represents current flowing in one direction only and the winding of the field coil 30 is such with respect to the main field excitation of the motor 10 as to cause the auxiliary excitation provided by the field winding 30 to add to the main field excitation to thus cause a decrease in the speed of motor 10 to automatically bring the motor back to the speed which will produce the desired frequency on generator 12.

Assume now that the speed of motor 10 is decreased for any reason. In this event, the frequency of the output of the generator 12 will decrease and the output potential of generator 12 may be represented by a wave form 36. The impulse now applied by the commutator device 24 to the field winding 30 of motor 10 is represented by the shaded area between the dotted lines 38, the base line and the curve 36. It will be seen that this impulse of current is flowing in the opposite direction from that of the impulse discussed in connection with the conditions represented by curve 34, and this impulse will, therefore, energize field winding 30 in such a direction as to counteract and subtract from the excitation of the motor 10 provided by main field winding 16. This will cause decreased excitation of motor 10 which, in turn, will cause the motor to speed up to automatically re-establish the desired frequency on generator 12.

Instead of applying the impulses from the alternating-current output to the field excitation of motor 10 through auxiliary field winding 30, these impulses may be applied directly to the shunt field winding 16.

It is to be understood that the conditions represented by curves 34 and 36 of Fig. 2 are somewhat exaggerated in order to better illustrate the principles of operation of the device, that the slightest deviation from normal or standard frequency will cause correcting impulses to be applied to the field winding 30, and that correction of the speed of motor 10 may take place before the frequency of generator 12 has varied from the standard frequency as much as is represented by the difference between the potential waves 34 and 36 and the standard potential wave 32 in Fig. 2.

It will be seen that I have provided a simple and effective means for maintaining the frequency of the potential of a direct-current-motor driven alternating-current generator at a desired standard frequency which requires but a very small capacity of alternating current standard frequency source.

In compliance with the requirements of the patent statutes, I have shown and described herein a preferred embodiment of my invention. It is to be understood, however, that the invention is not limited to the precise construction shown and described but is capable of modification by one skilled in the art, the embodiment herein shown being merely illustrative of the principles of my invention.

I claim as my invention:

1. In combination, a source of standard frequency, an alternating-current generator, means for driving the generator, and means operated from the standard frequency source for controlling the speed of the generator driving means thereby to maintain a predetermined relation between the frequency of the generator and the standard frequency.

2. In combination, a direct-current motor having a main field winding and an auxiliary field winding, an alternating-current generator driven by said motor, and means for intermittently connecting said auxiliary field winding with the output of said generator for limited periods at regular predetermined intervals.

3. In a speed control system, a direct-current motor, a constant speed continuously operating device, and means for varying the excitation of said motor in accordance with the variations of the speed of said motor with respect to the speed of said continuously operating device.

4. In a speed control system, a direct-current motor having a main field winding and an auxiliary field winding, an alternating-current generator driven by said motor, and means for intermittently connecting said auxiliary field winding with the output of said generator for limited periods at regular intervals comprising a constant speed continuously rotating device.

5. In a speed control system, a direct-current motor having a main field winding and an auxiliary field winding, an alternating-current generator driven by said motor, and means for intermittently connecting said auxiliary field winding with the output of said generator for limited periods at substantially regular predetermined intervals comprising a continuously moving device having a substantially constant rate of movement.

6. In a system for maintaining a predetermined frequency on an alternating-current generator, a source of alternating current of said predetermined frequency, a direct-current motor for driving said generator, said motor having a main field winding and an auxiliary field winding, and means for intermittently connecting said auxiliary field winding in circuit with said generator for limited periods at regular intervals comprising a commutator driven by a synchronous motor energized from said source of predetermined frequency.

7. The method of regulating the speed of a direct-current motor which drives an alternating-current generator so that said generator may have an output of a predetermined frequency, comprising the steps of bringing said motor up to the required speed and thereafter causing the output of the generator to affect the excitation of the motor for limited periods at intervals determined by the predetermined frequency.

8. In a speed regulating system, a motor having main and auxiliary field windings, an alternating-current generator driven by said motor and means for so controlling the speed of said motor as to maintain a predetermined frequency of generator output comprising means for connecting said generator voltage to said auxiliary field winding for limited intervals at said predetermined frequency so that when said generator voltage is at the same frequency as said predetermined frequency the auxiliary field will always be affected the same by that portion of the generator voltage wave to which it is intermittently connected and when said generator speed increases or decreases, the part of the generator voltage wave to which said auxiliary field is intermittently connected will be such as to increase or decrease the excitation of said motor so as to regulate its speed to re-establish the desired generator frequency.

9. In combination, a direct-current motor, an alternating-current generator driven by said motor and means for causing the output of said generator to affect the excitation of said motor for limited periods at regular predetermined intervals.

DOUGLASS A. YOUNG.